United States Patent
Fernandes et al.

(10) Patent No.: US 12,493,459 B1
(45) Date of Patent: Dec. 9, 2025

(54) REGULATIONS AND DIRECTIVES TO CODE PLATFORM

(71) Applicant: Morgan Stanley Services Group Inc., New York, NY (US)

(72) Inventors: Cheryl M. Fernandes, Plainsboro, NJ (US); Himani Garg, Livingston, NJ (US); Alex Gavrilov, Calgary (CA); Vijay Kumar Butte, Princeton Junction, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/306,592

(22) Filed: Aug. 21, 2025

(51) Int. Cl.
G06F 9/44 (2018.01)
G06F 8/65 (2018.01)

(52) U.S. Cl.
CPC ..................................... G06F 8/65 (2013.01)

(58) Field of Classification Search
CPC ........ G06F 8/65; G06F 40/30; G06F 16/3344; G06F 40/284; G06F 8/71; G06F 40/205; G06F 16/55; G06F 16/45; G06F 8/30; G06F 16/483; G06F 40/197; G06F 40/279; G06F 40/56; G06F 16/383; G06F 16/48; G06F 18/23; G06F 16/3329; G06F 16/90332; G06F 16/164; G06F 16/24552; G06F 16/254; G06F 16/258; G06F 16/906; G06F 16/9027; G06F 16/583; G06F 2111/02; G06N 20/00; G06N 3/045; G06N 3/02
See application file for complete search history.

(56) References Cited

U.S. PATENT DOCUMENTS

| | | |
|---|---|---|
| 11,765,207 B1 | 9/2023 | McCarthy |
| 2020/0106810 A1 | 4/2020 | Schwartz et al. |
| 2023/0259650 A1 | 8/2023 | Sepehri et al. |
| 2024/0094993 A1 | 3/2024 | Weis et al. |
| 2024/0143800 A1 | 5/2024 | Lu et al. |
| 2025/0251932 A1* | 8/2025 | Hensley .................. G06F 16/31 |
| 2025/0278526 A1* | 9/2025 | Roper, Jr. ............... G06F 30/15 |

* cited by examiner

*Primary Examiner* — Chuck O Kendall (74) *Attorney, Agent, or Firm* — Leason Ellis LLP (57) ABSTRACT

A method of implementing a regulation and directive to code platform comprises automatically pulling updates of a new regulation document from policy regulation sources, chunking the regulation document into smaller segments, generating embeddings of the segments of the using an LLM, classifying and extracting metadata from the new regulation document based on the classification, storing the embeddings of the segments with metadata tags in a retrieval automated generation (RAG) database, storing the extracted metadata extracted in an enterprise policy repository, extracting actionable items from the segments into a code form based on a prompt using an LLM, extracting template artifacts from the segments based on another prompt using an LLM, storing the extracted actionable items and template artifacts in the enterprise policy repository, and generating a central policy user interface through which users can access, review and update all regulation and directive information including the actionable items and template artifacts.

17 Claims, 8 Drawing Sheets

Prompt 1

Create a detailed text document on Block Chain Technology Risk Management based on JSON below:
```json
{
"Sections":{
"4": "Standard: Technology Risk Management",
"4.1": "Overview/Background",
"4.2": "Global Technology Policy",
"4.3": "Technical Scope",
"4.4": "Organizational Applicability",
"4.5": "Risk Appetite Statement",
"4.6": "Technology Risk Management",
"4.7": "Quality Assurance",
"4.8": "Related Documentation",
"4.9": "Description and Function of Standard Elements",
"4.10": "Glossary",
"4.11": "Governance",
"4.12": "Revision History"
}
}
```

Chat GPT Prompt: See Prompt 1

Create a detailed text document on Block Chain Technology Risk Management based on JSON below: ——————— 605

Block Chain Technology Risk Management

Standard: Technology Risk Management          610

4.1 Overview/Background
In the context of evolving digital landscapes, blockchain technology emerges as a revolutionary approach towards decentralized information management and financial systems. It is imperative to understand Blockchain from a risk management perspective due to its inherent characteristics, such as immutable data structures and distributed peer-to-peer topology.

4.2 Global Technology Policy          614
Given the global utilization of blockchain technology across various sectors—finance, healthcare, logistics—there is a crucial need for a comprehensive and adaptable global technology policy that addresses the peculiarities of blockchain systems. This policy should include international cooperation to create standards ensuring security, privacy, and interoperability of technology.

4.3 Technical Scope
The technical scope of blockchain risk management encompasses the architecture, design, deployment, and maintenance of blockchain networks. It also covers protocols, smart contracts, consensus mechanisms like Proof of Stake or Proof of Work, and the security practices concerning these components.

4.4 Organizational Applicability
Blockchain technology can be applied to a myriad of organizational procedures ranging from transaction processing to record management and auditing. However, specific focus is required on areas like infrastructure security, data privacy, and compliance with regulatory requirements.

4.5 Risk Appetite Statement
An organization's risk appetite statement regarding blockchain should clearly articulate the level of risk the organization is prepared to accept. This includes risks associated with cyber-attacks, technological failures, regulatory non-compliance, and risks from third-party service providers or consortia.

4.6 Technology Risk Management
Effective technology risk management for blockchain involves identifying, assessing, and mitigating risks associated with the deployment and operation of blockchain systems. Specific areas of focus include cybersecurity, user authentication processes, access controls, and the integrity of the underlying technology.

4.7 Quality Assurance
Quality assurance in blockchain technology entails ensuring that all software and hardware components meet strict standards to operate securely and efficiently. It also requires rigorous testing of blockchain solutions to meet both functional and non-functional requirements before wide-scale implementation.

4.8 Related Documentation
Documentation related to blockchain risk management should include but not be limited to, system documentation, risk management policies, incident response plans, and user training materials. Proper documentation ensures that stakeholders are aware of protocols and procedures and can help trace issues when they occur.

4.9 Description and Function of Standard Elements
Blockchain's standard elements include nodes, blocks, miners, and digital signatures. Each element plays a crucial role in the ecosystem's security and efficiency, and understanding the function and potential vulnerabilities of these elements is critical for risk management.

4.10 Glossary          618
The glossary section should provide clear and concise definitions of all terms used in the context of blockchain and its risk management. Terms could include, but are not limited to, Distributed Ledger Technology (DLT), Hash Rate, Hard Fork, Soft Fork, and Gas Fees.

4.11 Governance
Governance in blockchain involves the processes and policies that control how decisions are made and executed within the network. It is vital for managing the risks associated with change management, updates, and adverse actions by participants in the network.

4.12 Revision History
The document's revision history tracks all changes made to the risk management guidelines, ensuring transparency and providing a reference that outlines how risk management strategies have evolved over time.

FIG. 6

Prompt 2

Create a html Block chain Technology Risk Management Policy based on css below. Include sections on Overview/Background,Technical Scope,Organizational Applicability, Risk Appetite Statement,Technology Risk Management,Quality Assurance,Related Documentation,Description and Function of Standard Elements,Glossary,Governance, Revision History

```css
/* Version: 1.12 */
/* Section 4.7 Quality Assurance CSS */
/* Base styles for Section 4.7 */
.section-4-7 {
    font-family: Arial, sans-serif;
    color: #333;
    line-height: 1.6;
    margin: 20px;
}
/* Headings and subheadings */
.section h1,
.section h2,
.section h3 {
    color: #0056b3;
    margin-top: 20px;
}
.section h1 {
    font-size: 24px;
}
.section h2 {
    font-size: 20px;
}
```
— 705
— 710

```css
.section h3 {
    font-size: 18px;
}
/* Paragraphs */
.section p {
    font-size: 14px;
    margin-bottom: 15px;
}
/* Lists */
.section ul {
    list-style-type: disc;
    margin-left: 40px;
}
.section ul li {
    margin-bottom: 10px;
}
/* Table styles */
.section table {
    width: 100%;
    border-collapse: collapse;
    margin-top: 20px;
    box-shadow: 0 1px 3px rgba(0,0,0,0.1);
}
.section th,
.section td {
    padding: 8px;
    text-align: left;
    border-bottom: 1px solid #ddd;
}
.section th {
    background-color: #f4f4f4;
    color: #333;
    ...
}
```

Include a table of Control_Requirements in a table as in json below

```json
{
  "Section": "Sample Requirements Table",
  "Control_Objectives": {
    "a": "Quality and performance procedures for the Firm's technology are documented and maintained.",
    "b": "A governance process is in place to oversee the performance and quality of the Firm's technology.",
    "c": "Training and awareness is provided to ensure that Firm personnel understand their roles and responsibilities."
  },
  "Control_Requirements": [
    {
      "Control_No": "QAM-01",
      "Requirement_Statement": "Primary Control Owners (PCOs) or Delegates must establish controls committees for the Technology Standards that they own.",
      "RCF_Mapping": "G-GPO.2.1",
      "ARR_Applicability": "All ARR",
      "Responsible_Party": "PCOs or Delegates",
      "Approved_Solutions": "N/A",
      "Compliance_Monitoring": "Manually tested",
      "Asset_Applicability": "N/A – Process based control"
    }
  ]
}
```
— 715
— 720

FIG. 7

Chat GPT Prompt: See Prompt 2 — 805

Create a Block chain Technology Risk Management Policy in formatted HTML based on css below `''css
Include a table of Control_Requirements in a table as in json below `'' json

Blockchain Technology Risk Management Policy

*Overview/Background*

This policy defines the approach and scope of risk management for utilizing blockchain technology within the organization.

*Technical Scope*

The technical scope covers all aspects of blockchain technologies adopted by the firm, including distributed ledgers, smart contracts, and related infrastructure.

*Organizational Applicability* —— 814

This policy applies to all divisions and personnel involved in the implementation and operation of blockchain technology.

*Risk Appetite Statement*

The firm maintains a cautious risk appetite, prioritizing security and compliance in our blockchain implementations.

*Technology Risk Management* —— 818

Effective risk management strategies and tools are adopted to mitigate various risks associated with blockchain technology.

*Quality Assurance*

High standards of quality assurance are maintained to ensure the reliability and performance of blockchain-based solutions.

*Sample Requirements Table*

810 →

| Control No | Requirement Statement | PCF Mapping | ARR Applicability | Responsible Party | Approved Solutions | Compliance Monitoring | Asset Applicability |
|---|---|---|---|---|---|---|---|
| QM-01 | Primary Control Owners (PCOs) or Delegates must establish controls committees for the Technology Standards that they own. | G-BPO-2.1 | All ARR | PCOs or Delegates | N/A | Manually tested | N/A – Process based control |

820 ↗

*Related Documentation*
- Blockchain Implementation Guide
- Security Standards for Cryptographic Operations

*Description and Function of Standard Elements*

Defines various expectation components such as scope, exceptions, and blockchain protocols, and their functional roles.

FIG. 8

REGULATIONS AND DIRECTIVES TO CODE PLATFORM

FIELD OF THE DISCLOSURE

The present disclosure relates to artificial intelligence systems, and more particularly, relates to a system and method for providing a regulations-and-directives to code platform (RDtoC).

BACKGROUND OF THE DISCLOSURE

Concerns regarding the use of computer resources, cybersecurity risks and other issues related to information technology deployment have caused organizations to develop enterprise business and technology policies. Such policies can include one or more of: acceptable use policies which outline the appropriate use of company technology resources, including computers, internet access, and software; bring your own device (BYOD) policies which set guidelines for using personal devices; data protection and privacy policies that set forth in detail how the organization company collects, stores, and protects employee and customer data; and cybersecurity policies which are designed to cover such items as password management, the use of antivirus software, regular software updates, and protocols for reporting security incidents. Other useful technology policies can govern use of social media, remote work, monitoring, surveillance and resource utilization. Business policies can be related to, for example, financial regulations, compliance, audits and human resources.

With the rapidly evolving technology and business policy landscape it has become imperative to rewrite such technology policies periodically and to effectively communicate changes to stake holders in a time-sensitive and consistent manner. Policy updates to comply with rules and regulations require hours of manual effort. There exists a critical gap between formulating a technology policy, or a technology policy implementing regulator and business rules, and ensuring its correct implementation by relevant technology systems and development teams. This leads to inefficient allocation of investment and non-compliant systems which can result in costs and reputational losses to organizations.

What is therefore needed is a way of automating the process of pulling regulatory updates from various sources (e.g., FINRA, SEC, OCC) and tracking the lineage of regulations and policies in an organization-wide manner.

SUMMARY OF THE DISCLOSURE

In a first aspect, the present disclosure describes a computer-implemented method of implementing a regulation and directive to code (RDtoC) platform. The method includes automatically pulling updates of a new regulation document from policy regulation sources, chunking the new regulation document into smaller segments, generating embeddings of the segments of the new regulation document using an LLM, classifying the new regulation document, extracting metadata from the new regulation document based on a classification of the new document, storing the embeddings of the segments with metadata tags in a retrieval automated generation (RAG) database, storing metadata extracted in an enterprise policy repository, extracting actionable items from the segments into a code form based on a prompt using an LLM, extracting template artifacts from the segments based on another prompt using an LLM, storing the extracted actionable items and template artifacts in the enterprise policy repository, and generating a central policy user interface through which users can access, review and update all regulation and directive information including the actionable items and template artifacts.

In certain embodiments, the method also includes receiving a prompt to generate a new regulation policy from a user, enhancing the prompt by adding additional contextual information from a library based on contents of the prompt, querying the enterprise policy repository to retrieve a list of matching templates and table of contents based on the prompt, and generating a new regulation policy based on the user prompt and list of matching templates and table of contents using an LLM.

In another aspect, the present disclosure describes a computer-implemented system that includes at least one processor for implementing a regulation and directive to code (RDtoC) platform that comprises a pipeline module configured to automatically pulling updates of a new regulation document from policy regulation sources, a chunking module configured to chunk the new regulation document into smaller segments and in conjunction with an LLM, to generate embeddings of the segments of the document, a classifier configured to classify and extract metadata from the new regulation document, a retrieval automated generation (RAG) database coupled to the LLM and to the chunking module and adapted to store the embeddings of the segment with metadata tags, an enterprise policy repository coupled to the classifier and the LLM and adapted to store metadata extracted from the new document. The LLM is configured to generate embeddings of the segments of the new regulation document produced by the chunking module, extract actionable items from the segments of the new regulation document into a code form based on a prompt, extract template artifacts from the segments of the new regulation document based on another prompt. The system further includes an enterprise policy repository coupled to the LLM for storing the extracted actionable items and template artifacts.

These and other aspects, features, and advantages can be appreciated from the following description of certain embodiments and the accompanying drawing figures and claims.

BRIEF DESCRIPTION OF THE DRAWINGS

FIG. 6 depicts a sample output of a policy document from the LLM based on the sample prompt shown in FIG. 5.

FIG. 7 depicts another example of a prompt entered in a policy generation UI in which request for a new HTML policy code document is entered using a prompt with sample text according to the method of the present disclosure.

FIG. 8 depicts output by an LLM of the prompt entered in the policy generation UI of FIG. 7

DESCRIPTION OF CERTAIN EMBODIMENTS OF THE DISCLOSURE

The present disclosure describes a regulations-and-directives to code platform (RDtoC) and method that leverages generative artificial intelligence ("Gen AI") to standardize a common specification for the rules and regulations aligned to a policy area. Once the common specification is generated, new policies can be more easily created and updated. The new and/or updated policies are then translated to code. The code is then distributed to organizational groups such as development teams for a seamless end-to-end implementation.

Figure 1:
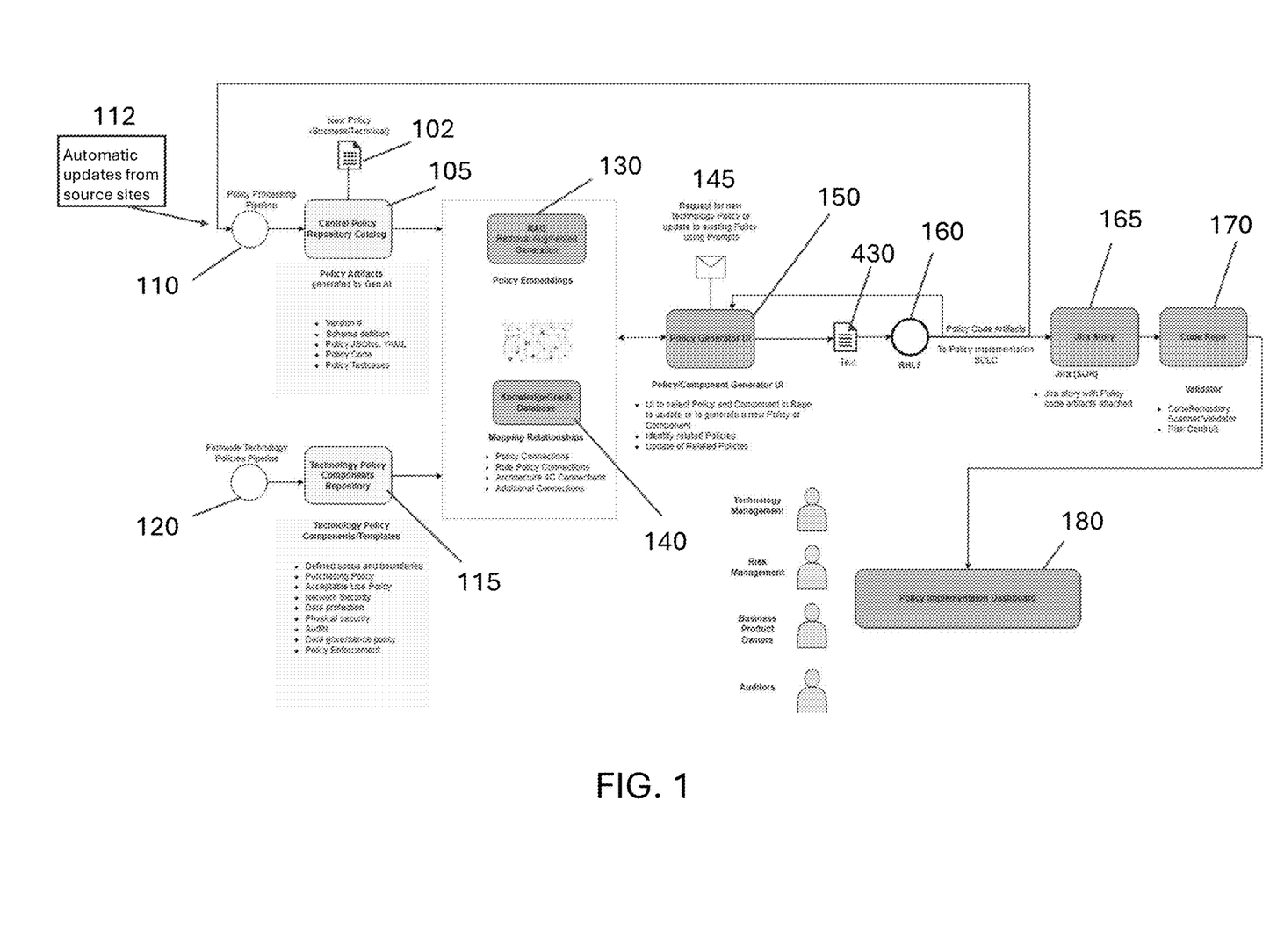
FIG. 1 is a schematic flow diagram of an embodiment of a method for implementing a Regulations/Directives to code (RDToC) platform and for generation of new policy documents according to an embodiment of the present disclosure.

FIG. 1 is a schematic flow diagram of an embodiment of a method for obtaining a common specification for the rules and regulations aligned to policy areas according to an embodiment of the present disclosure. In a first stage, which is an information gathering stage, a new natural language document 102 that contains information regarding a new or updated business/technology policy is received. Information from the new policy document 102 is extracted to an enterprise policy repository catalog 105 that is also fed information more generally from a policy processing pipeline 110. The policy processing pipeline is designed to develop an intelligent and versioned repository/library catalog for enterprise policies by business and technology area. The policy pipeline preferably automatically pulls updates from source sites for policy documents 112 which can be accessed by URLs or APIs. The enterprise policy repository catalog 105 includes extracted policy artifacts including artifacts such as schema definitions, policy JSONs (JavaScript Object Notations) and configuration files, policy codes, policy testcases and version numbers. Automatically pulling updates from the source sites via website URL or APIs (FINRA websites, SEC website, e.g.)

Another source of information, a technology policy components repository 115, is informed by an enterprise technology policy pipeline 120. The technology policy components repository 115 includes data concerning previously-issued and documented policies such as, but not limited to, the defined scope and boundaries of policies, purchasing policies, acceptable use policies, policies concerning network security, physical security, audits, data governance and policy enforcement. Information extracted from the enterprise policy repository catalog 105 and technology policy components repository 115 is used for retrieval automated generation (RAG) 130. RAG is a process that improves the context of interactions with large language models (LLMs) so that the models can respond to user queries with reference to a more focused set of documents than would otherwise occur. An implementation of a RAG process for a new policy document is described in greater detail with reference to FIG. 2.

Figure 2:
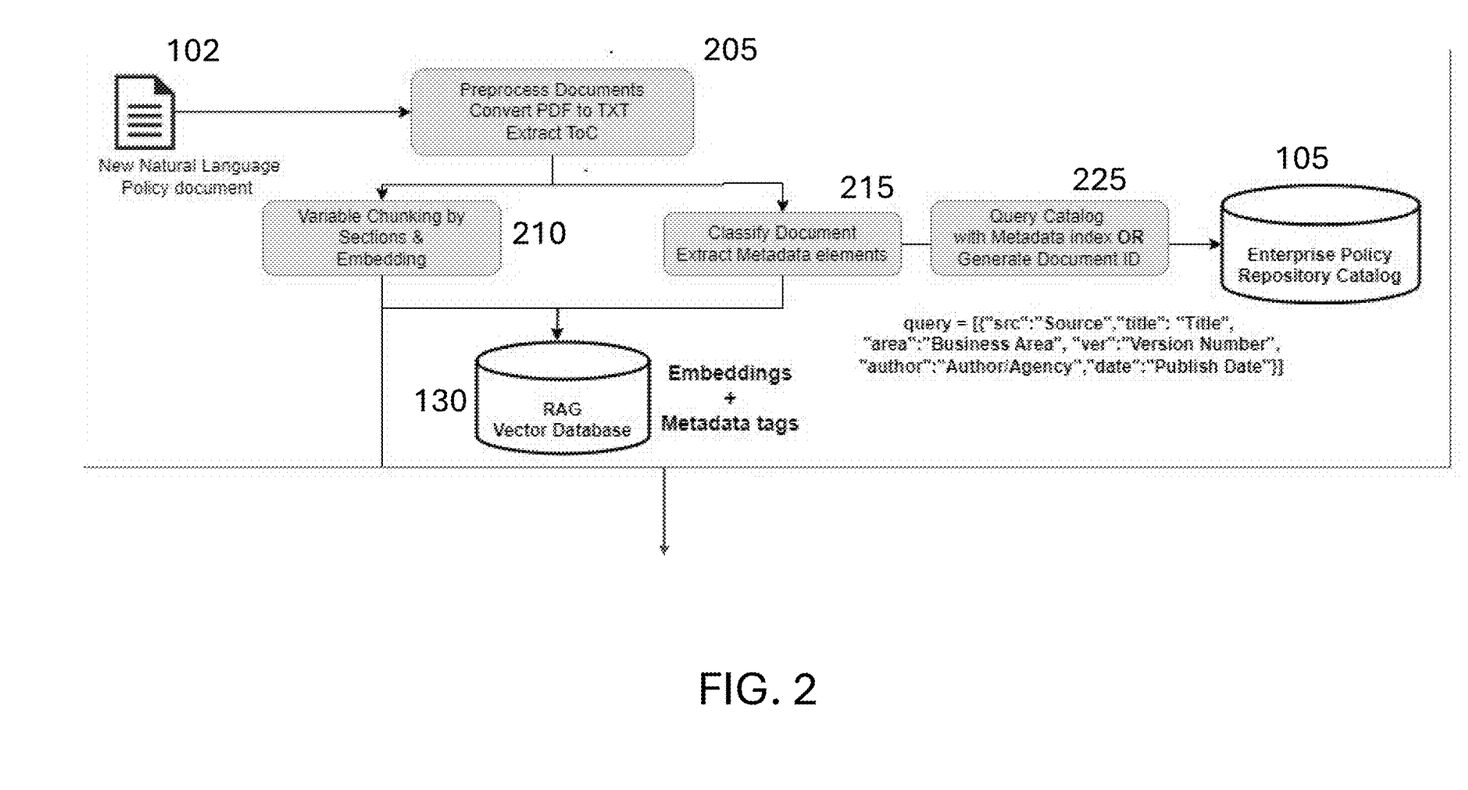
FIG. 2 is an exemplary schematic flow diagram of a process for extracting information from a new regulation or policy document according to an embodiment of the present disclosure.

FIG. 2 is an exemplary schematic flow diagram of a process for extracting information from the new policy document 102 according to an embodiment of the present disclosure. The new policy document 102 is first preprocessed 205 to convert any pdf content into text and to extract any table of contents included in the document. The preprocessed document is then subjected to variable chunking and embedding 210. The variable chunking involves dividing the text into sections of variable length such as sentences. The embedding process involves computing a vector representation of the chunked text. The embedding task is performed by or with the assistance of a large language model ("LLM"), such as, for example, ChatGPT 4.1. Parallel to the variable chunking and embedding process, the preprocessed document undergoes a classification process 215 in which metadata is extracted from the document. In this process an LLM is used to identify the metadata within the document that is most relevant and to extract the metadata for storage and subsequent use. The metadata extracted can include key information such as rule identifiers, and the requirements and mandates set forth in each policy.

The outputs of the variable chunking and embedding process and of the metadata extraction process 215 are stored in RAG database 130. More specifically, the RAG database 130 stores vectorized embeddings and metadata tags derived from the original documents. The reduction of the original documents into these components enables the standardization of the policy document content. The combined output of the classification and metadata extraction process 215 is also used to form a query 225 to the enterprise policy repository catalog 105 in order to retrieve the most similar policy artifacts that are stored in the catalog.

Figure 3:
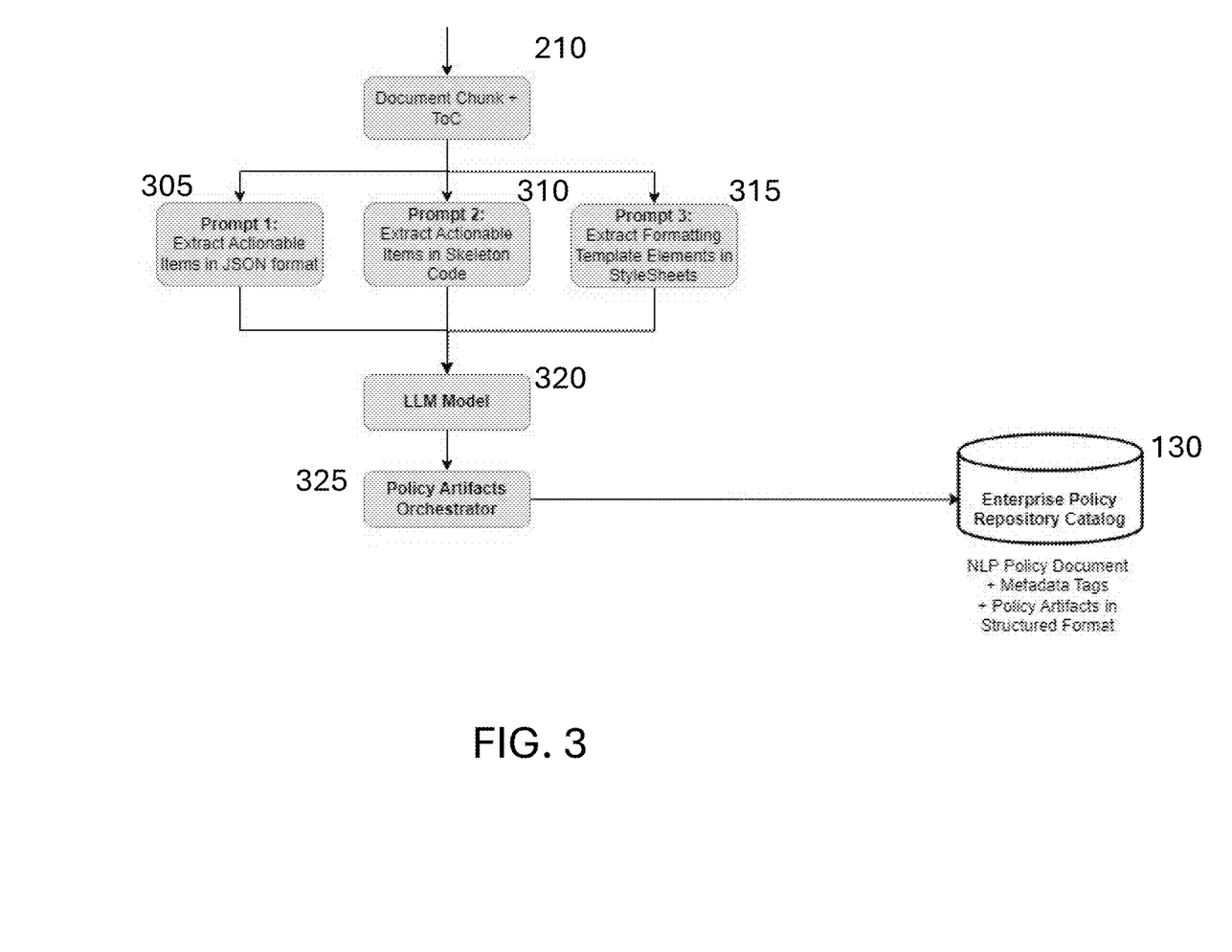
FIG. 3 is a flow diagram that depicts further details of an embodiment of the extraction processes that uses an LLM which are performed after chunking.

FIG. 3 is a flow diagram that depicts further details of an embodiment of extraction processes using an LLM that are performed after the chunking process described above. A first prompt 305 is formulated to extract actionable items in the chunked segments and table of contents in a JSON format. A second prompt 310 is formulated to extract contents from the same data in the form of a skeleton code. A third prompt 315 is formulated to extract formatting template elements from stylesheet (CSS) documents. Prompts 305, 310, 315 are submitted to LLM 320 for processing. The output of LLM 320, which constitutes policy artifacts in a standardized format such as JSON, is submitted to an orchestrator module 325 that coordinates storage of policy artifacts in a structured format with associated metadata in the enterprise policy repository catalog 105. During the process of creating the standardized policy code, the LLM can generate placeholder code for policy requirements to be subsequently added to the code.

Returning to FIG. 1, new policy documents are processed to yield embeddings and metadata. In parallel, the extraction of data from the new policy document 102 is used to establish a knowledge-graph database 140 which stores policy connections, rule connections, architecture 4C connections and other relationships between the main types of data extracted from policy documents. Knowledge-graph databases present information as nodes (entities), connections (which denote relationships between the entities) and attributes which provide additional information about the nodes (entities) and connections (relationships). To fill out the knowledge-graph database 140, relevant information is received from the technology policy components repository 115. The technology policy components repository 115 includes templates defined with JSON specifications for the types of components associated with policy categories.

Apart from the document extraction, embedding and storage process described thus far, there is distinct policy generation UI process shown in FIG. 1, that allows users to request 145 a new business or technology policy or update an existing policy directly based on user prompts to an LLM interface. In this process a user prompt is entered into a policy generation user interface (UI) 150. The policy generation UI 150 facilitates the user in this process by enabling selection of a policy in the enterprise policy repository catalog 105 for updating.

Figure 4:
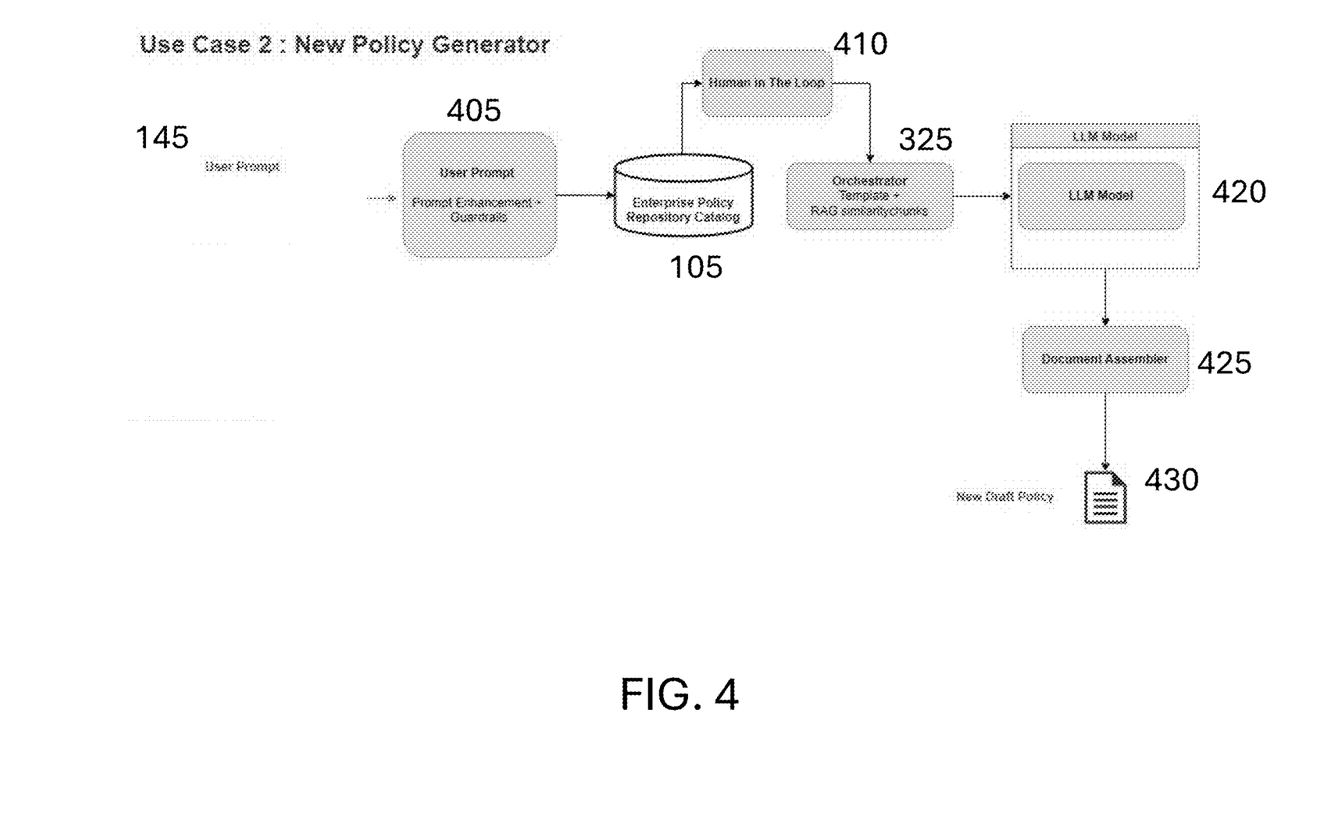
FIG. 4 is an exemplary flow diagram that shows details of an embodiment of a policy generation process using prompts according to an embodiment of the present disclosure.

FIG. 4 is an exemplary flow diagram that illustrates details of an embodiment of a new policy generation process using prompts. A user prompt 145 for generating a new policy is modified by a process of enhancement and guardrail addition 405. The enhancement aspect of the process involves automatic provision of additional information and context which can come from a library of prompts or from the enterprise repository. The guardrail process involves automated modifications to the prompt to avoid certain types of output. The modified user prompt 405 is used in a query to retrieve a list of matching templates and table of contents from the enterprise policy repository catalog 105. An operator can enter the loop 410 at this stage to check and modify the matching results to ensure that the most similar matching templates and table of contents are obtained. An additional search is implemented by an orchestrator module 325 (show in FIG. 3) in the RAG vector database 130 for each section of the matched table of contents based on similarity. The combination of the user request, selected template(s), table of contents and RAG contents are input to an LLM model 420 which then generates an initial new policy output for augmentation and formatting. The LLM 420 can draw on information in the RAG database 130 and knowledge-graph database 140 for augmenting the output. The initial new policy output is received by a document assembler 425 which is configured to reformat the initial new policy output into a finalized new policy document 430 based on templates. The document assembler thereby ensures a standardized output of policy artifacts (e.g., JSON format) for any newly generated policy documents based on prompts to the policy generation UI 150.

Returning again to FIG. 1, the finalized new policy document 430 is checked for accuracy in a reinforcement learning from human feedback (RLHF) process 160 in which errors in the document are corrected by operators, and the LLM learns from the corrections for execution of subsequent prompts. After the policy has been corrected by the RLHF process 160, the policy code artifacts (e.g., in JSON formatting) of the document 430 are ready to be used in the software development life cycle and also ready to be delivered to the policy processing pipeline 110 for embedding, augmentation and storage. In the depicted embodiment, the policy code artifacts can be imported into project management applications 165 such as, but not limited to, Jira Story produced by Atlassian Plc of Sydney, Australia. The policy code artifacts are utilized by software development teams and software code is uploaded to a code repository 170. The code repository 170 is scanned to verify that policy/regulations have been implemented in the software and to implement risk control.

After the policy code artifacts have been validated that can be presented in various ways in a policy implementation dashboard 180. The dashboard acts as a "one-stop" site for viewing, updating and implementing business and technology policies. The dashboard 180 provides a useful interface to enterprise task groups such as, but not limited to, technology management, risk management, business product owners, and auditors. The dashboard 180 enables several capabilities including the tracking the lineage of policies and the plugging any critical gaps that may emerge during implementation of technology or business policies.

Figure 5:
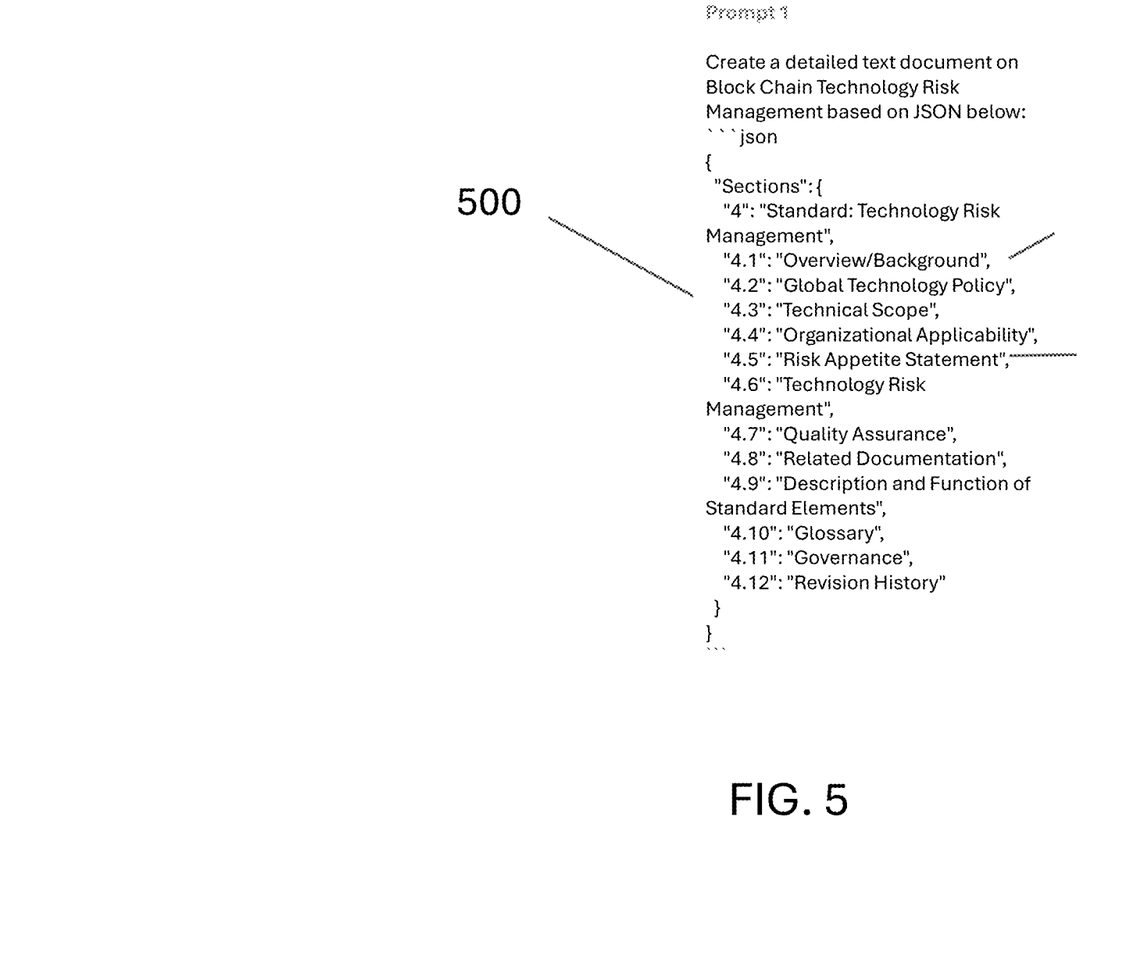
FIG. 5 depicts a sample prompt with a JSON template entered in the policy generation UI.

FIG. 5 depicts an example of a sample prompt comprising JSON (structured) text that includes a table of contents of a policy document. The sample JSON text 500 includes a number of topics. FIG. 6 depicts sample output of a policy document from the LLM based on the sample prompt shown in FIG. 5. As shown, the prompt 605 reads "create a detailed text document on Block Chain Technology Risk Management based on JSON below." The output includes a number of topic headings e.g., 614, 618 with descriptive text beneath.

FIG. 7 depicts another example of a sample prompt 705 that includes a request to create a block chain technology risk management policy in HTML as well as a table in JSON format 710 based on a CSS (cascading style sheets) document. As shown, the prompt 705 reads "create a Block chain Technology Risk Management Policy in formatted HTML based on CSS below [file name]. Include sections on [a number of different topic headings]." A secondary prompt 715 requests a table of control requirements in a table based on a JSON 720.

FIG. 8 depicts a sample output of the LLM to the prompt shown in FIG. 7. The output includes the original prompt 805, a body section 810 including policy text, and control requirements table 820. The body section includes topic headings e.g., 814, 818 related to the policy with descriptive text. The body is formatted in HTML hypertext per the request.

FIGS. 5-8 provide examples of how the methods of the present disclosure can be used to create standardized policy artifact code from a variety of different source documents. This code is machine-readable can be easily imported and used in project management and other software applications. The policy artifact code also provides a useful foundation for generation of C4 architecture diagrams.

There are a number of benefits and advantages of the policy as code platform described herein. The platform helps ensure that policies are consistently applied across different systems and environments. Security risks can be detected and prevent early in the development cycle, reducing vulnerabilities and potential breaches. Additionally, the platform enables greater version control and transparency. Policy changes are traceable and transparent, facilitating collaboration across teams.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization (e.g., to proxy vendor services) using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method of implementing a regulation and directive to code (RDtoC) platform comprising:
    automatically pulling updates of a new regulation document from policy regulation sources;
    chunking the new regulation document into smaller segments;
    generating embeddings of the segments of the new regulation document using an LLM;
    classifying the new regulation document;
    extracting metadata from the new regulation document based on a classification of the new document;
    storing the embeddings of the segments with metadata tags in a retrieval automated generation (RAG) database;
    storing metadata extracted in an enterprise policy repository;
    extracting actionable items from the segments into a code form based on a prompt using an LLM;
    extracting template artifacts from the segments based on another prompt using an LLM;
    storing the extracted actionable items and template artifacts in the enterprise policy repository; and
    generating a central policy user interface through which users can access, review and update all regulation and directive information including the actionable items and template artifacts.

2. The computer-implemented method of claim 1, further comprising:
    receiving a prompt to generate a new regulation policy from a user;
    enhancing the prompt by adding additional contextual information from a library based on contents of the prompt;
    querying the enterprise policy repository to retrieve a list of matching templates and table of contents based on the prompt; and
    generating a new regulation policy based on the user prompt and list of matching templates and table of contents using an LLM.

3. The computer-implemented method of claim 2, further comprising:
    Prior to generating the new regulation policy by the LLM, supplementing the prompt for generation of the new regulation document by adding similarity chunks from the RAG database to the prompt.

4. The computer-implemented method of claim 2, further comprising:
    verifying accuracy of the new regulation document using a reinforcement learning from human feedback (RLHF) process.

5. The computer-implemented method of claim 4, further comprising:
    attaching previously extracted actionable code and template artifacts related to the new regulation to the new regulation document generated by the LLM; and
    providing the new regulation document to the central policy user interface.

6. The computer-implemented method of claim 1, further comprising:
    updating a knowledge-graph database of enterprise technology and business policies using the metadata extracted from the new regulation document and using data obtained from a technology policy components repository.

7. The computer-implemented method of claim 1, wherein the code form into which the actionable items are converted is JSON code.

8. The computer-implemented method of claim 1, wherein the code form into which the actionable items are converted is a skeleton code.

9. A computer-implemented system that includes at least one least one processor for implementing a regulation and directive to code (RDtoC) platform that comprises:
    a pipeline module configured to automatically pulling updates of a new regulation document from policy regulation sources;

a chunking module configured to chunk the new regulation document into smaller segments and in conjunction with an LLM, to generate embeddings of the segments of the document a classifier configured to classify and extract metadata from the new regulation document;

a retrieval automated generation (RAG) database coupled to the LLM and to the chunking module and adapted to store the embeddings of the segment with metadata tags;

an enterprise policy repository coupled to the classifier and the LLM and adapted to store metadata extracted from the new document;

an LLM configured to;
- generate embeddings of the segments of the new regulation document produced by the chunking module;
- extract actionable items from the segments of the new regulation document into a code form based on a prompt;
- extract template artifacts from the segments of the new regulation document based on another prompt; and an enterprise policy repository coupled to the LLM for storing the extracted actionable items and template artifacts.

10. The computer-implemented system of claim 9, further comprising:
a central policy user interface dashboard configured to provide enable users to access, review and update all enterprise regulation information including the stored actionable items and template artifacts.

11. The computer-implemented system of claim 9, further comprising:
a new regulation policy module configured to receive a prompt for generating a new regulation policy from a user and to enhance the prompt by adding additional contextual information from a library based on contents of the prompt, and query the enterprise policy repository to retrieve a list of matching templates and table of contents based on the prompt, wherein the LLM is further configured to generate a new regulation policy document based on the user prompt and list of matching templates and table of contents.

12. The computer-implemented system of claim 11, further comprising:
an orchestrator module coupled to the policy generation user interface and configured to supplement the prompt for generation of the new regulation policy document by adding a template and similarity chunks from the RAG database to the prompt for processing by the LLM.

13. The computer-implemented system of claim 10, further comprising:
a code repository coupled to the orchestrator module and configured to store policy code artifacts in the new regulation policy code document.

14. The computer-implemented system of claim 11, further comprising:
a reinforcement learning by human feedback module coupled to new regulation policy module and the LLM, wherein the reinforcement learning by human feedback module allows an operator to review and provide feedback on the new regulation policy document generated by the LLM.

15. The computer-implemented system of claim 9, further comprising:
a technology policy components repository configured to store standardized templates for types of components associates with technology policy categories; and
a knowledge-graph databased coupled to the technology policy components repository and to the enterprise policy repository catalog, and configured to create a knowledge graph concerning enterprise technology and business policies based on data stored in the technology policy components repository and the enterprise policy repository catalog.

16. The computer-implemented system of claim 9, wherein the LLM is configured to extract actionable items from the segments of the new regulation document into JSON format.

17. The computer-implemented system of claim 9, wherein the LLM is configured to extract actionable items from the segments of the new regulation document into skeleton code.

* * * * *